United States Patent [19]

van Maanen

[11] 4,294,344

[45] Oct. 13, 1981

[54] APPARATUS FOR POSITIONING ARTICLES BETWEEN THE CARRIERS OF A DRAG CONVEYOR, SAID ARTICLES BEING FED IN A CONTINUOUS CLOSED ROW

[75] Inventor: Johannes D. van Maanen, Berkel en Rodenrijs, Netherlands

[73] Assignee: Tevopharm-Schiedam B.V., Netherlands

[21] Appl. No.: 77,375

[22] Filed: Sep. 20, 1979

[30] Foreign Application Priority Data

Sep. 21, 1978 [NL] Netherlands .......................... 7809612

[51] Int. Cl.³ ............................................. B65G 47/31
[52] U.S. Cl. ..................................... 198/461; 198/487; 198/491
[58] Field of Search ................................. 198/459–461, 198/487–488, 430, 489, 490, 491, 492

[56] References Cited

U.S. PATENT DOCUMENTS 3,572,495 3/1971 Luginbuhl .......................... 198/461
3,747,739 7/1973 Fuchs et al. ........................ 178/461

FOREIGN PATENT DOCUMENTS 1024427 2/1958 Fed. Rep. of Germany ...... 198/487

Primary Examiner—Robert B. Reeves
Assistant Examiner—Douglas D. Watts

[57] ABSTRACT

Apparatus for positioning articles fed in a continuous closed row between the carriers of a drag conveyor, comprising a first conveyor belt receiving the articles at one end, a second in-line conveyor belt movable at a higher speed than the first conveyor belt and arranged to transfer the articles to the drag conveyor, and an orbiting stop at the transition point between the first and second conveyor belts synchronized with respect to the movement of the drag conveyor whose path comprises a portion essentially parallel to the first conveyor belt in the direction of travel, a portion directed backwards and away from the conveyor belt, and a portion directed again towards the conveyor belt.

3 Claims, 6 Drawing Figures

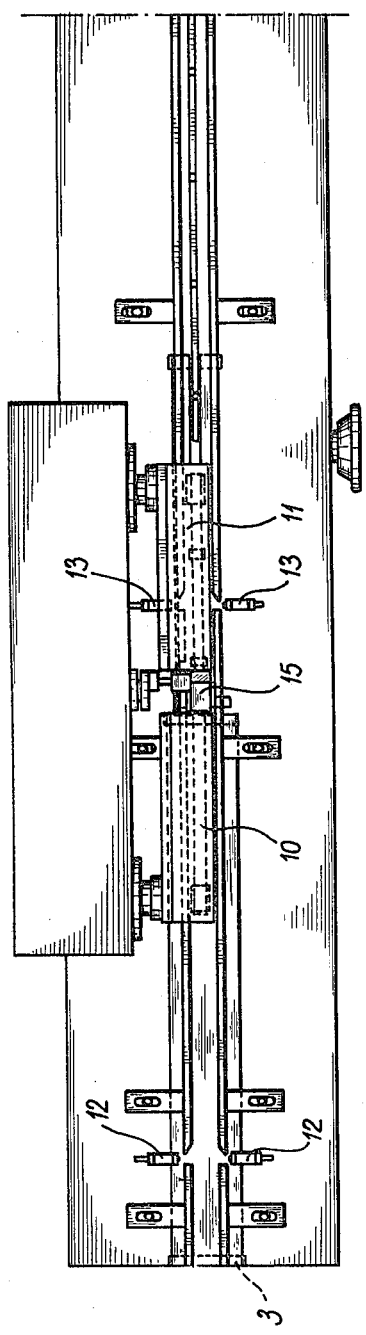
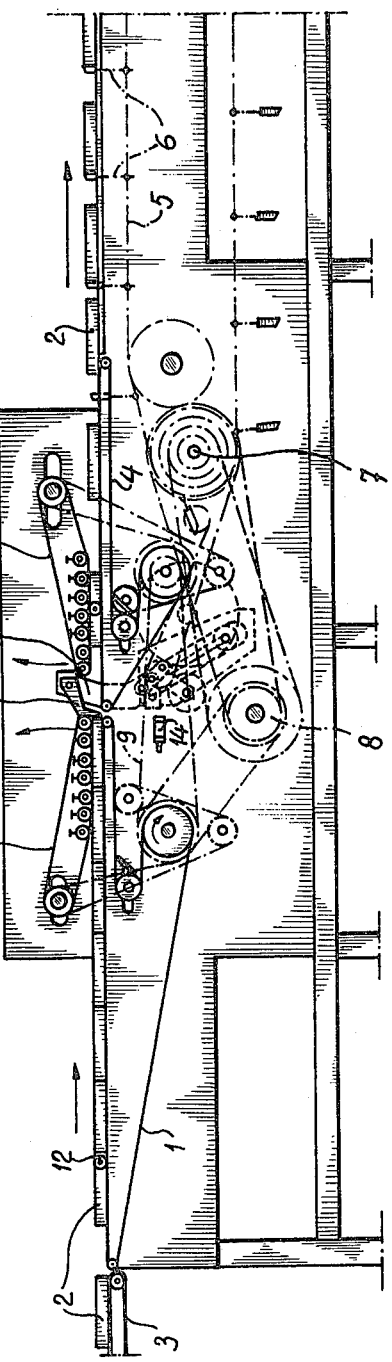

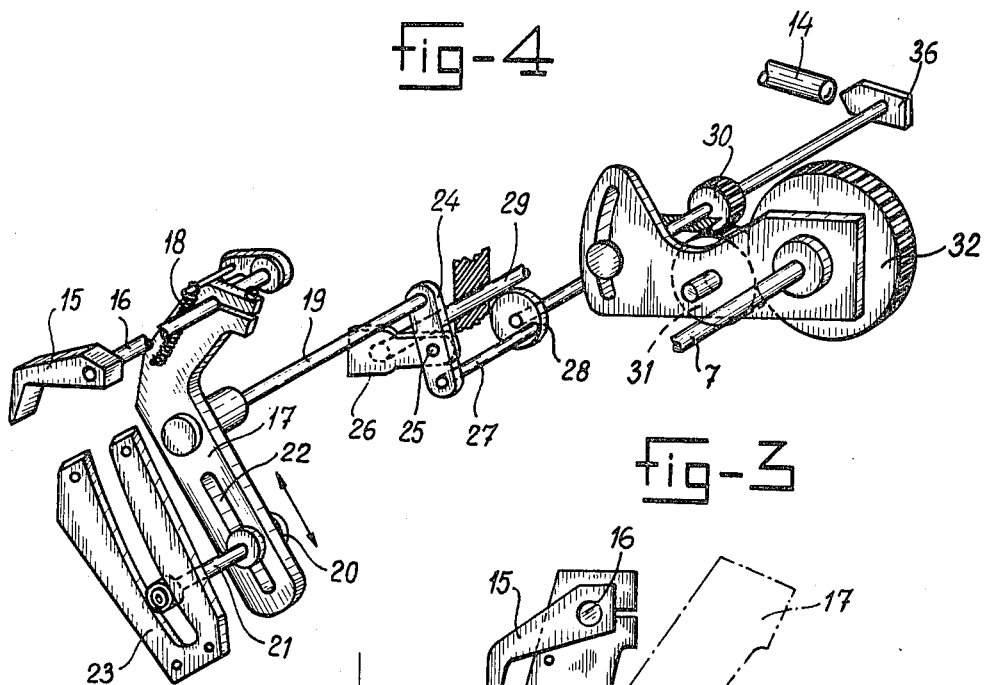
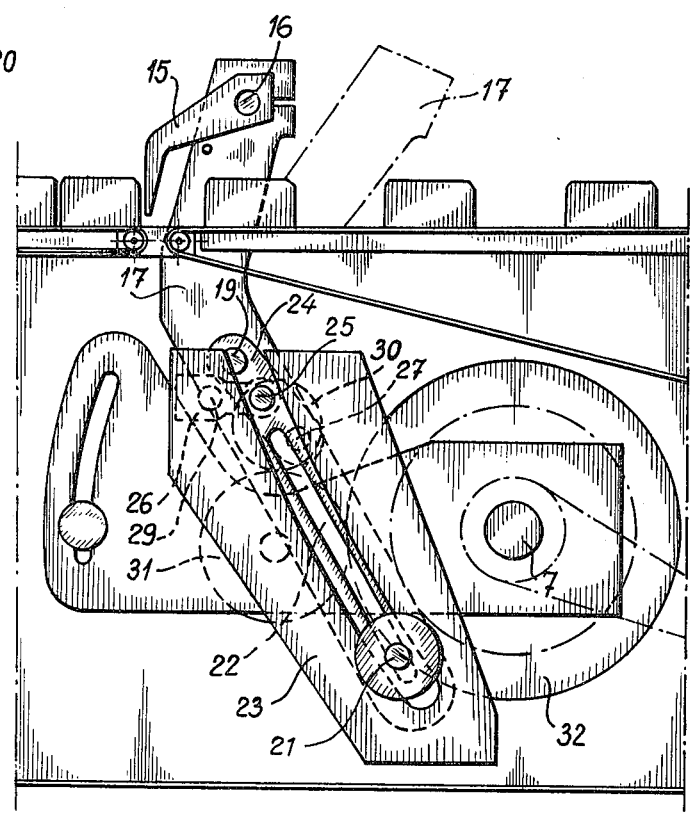

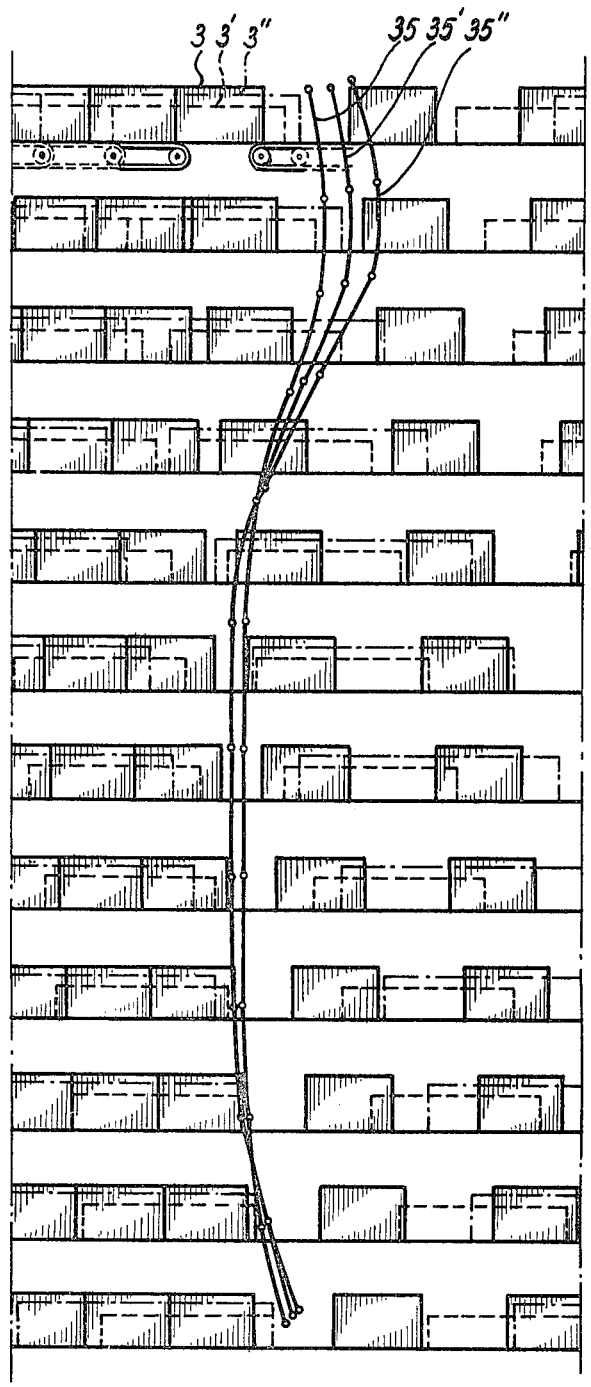

APPARATUS FOR POSITIONING ARTICLES BETWEEN THE CARRIERS OF A DRAG CONVEYOR, SAID ARTICLES BEING FED IN A CONTINUOUS CLOSED ROW

The present invention relates to an apparatus for positioning articles between the carriers of a drag conveyor, said articles being fed in a continuous closed row, comprising a first conveyor belt or conveyor belt system capable of receiving the articles at its one end and a second conveyor belt or conveyor-belt system disposed in line with the first conveyor belt, said second belt being arranged for moving at a speed which is greater than the speed of the first conveyor belt and to transfer the articles to the drag conveyor. An apparatus of this kind is known from Dutch Patent Application No. 73.12730.

An apparatus of this kind is particularly suitable for use in delivering products prepared in a continuous process to an apparatus where the products are being packed separately.

When starting the operation it is not possible in the known apparatus to have the first batch of articles arrive at once in a controlled relationship with respect to the carriers of the drag conveyor, so that quite a large number of said first articles emerge wrong with respect to the carriers and, consequently, they have to be discharged.

It is the object of the present invention to provide an apparatus of the type mentioned above which does not present the above drawback.

Said object is achieved in that in the apparatus according to the invention, at the transition point between the first and the second conveyor belt, a stop means is provided, the movement of said means being synchronized with respect to the movement of the drag conveyor, said stop means being movable in a endless path, said path comprising a portion extending essentially parallel to the first conveyor belt in the direction of travel, a portion directed backwards and away from the conveyor belt and a portion directed again towards the conveyor belt, such that during operation in the first path section the stop means moves along with and at a distance in front of an article which is advanced by said first conveyor belt, then, in the second path section said stop means moves away from said article and past said article to the rear and subsequently, in the third path section said stop means returns to its starting point, behind the article then being moved along faster by the second conveyor belt and in front of the next article still lying on the first conveyor belt.

In this way, when the apparatus is not in operation the stop means disposed in its lowest position, forms a stop in a fixed position for the products which are arriving, so that the operation can always be started from a position in which the first articles are situated correctly with respect to the carriers of the drag conveyor.

The stop means is preferably provided on an arm, said arm being mounted for a pivotal movement about a pivot point and a sliding movement along said point, which arm is connected to a crank means through a link means, said link means at its one end being pivotably connected to the arm, an at its other end being connected to said crank means and intermediate said ends being pivotably connected to a rocker element mounted for a pivotal movement about a fixed point. The pivot point of the arm may be adjustable.

A detecting means for scanning an arriving article is advantageously disposed in the proximity of the second conveyor belt for scanning an arriving article, while a rotating indicator means is provided, the movement of which is synchronized with respect to the movement of the drag conveyor, a second detecting means being disposed in the proximity of said indicator, and means are present for comparing the signals from the detecting means and for giving a signal for changing the speed of the first conveyor belt.

The invention will now be described more in detail with reference to the accompanying drawing, wherein:

FIG. 1 is a top view of an apparatus according to the present invention;

FIG. 2 is a side view of said apparatus;

FIG. 3 is an enlarged side view of the stop means arranged in the apparatus according to FIG. 1 and 2;

FIG. 4 is an exploded view of the stop means;

FIG. 6 illustrates the various positions of the stop means with respect to the articles.

Figure 5:
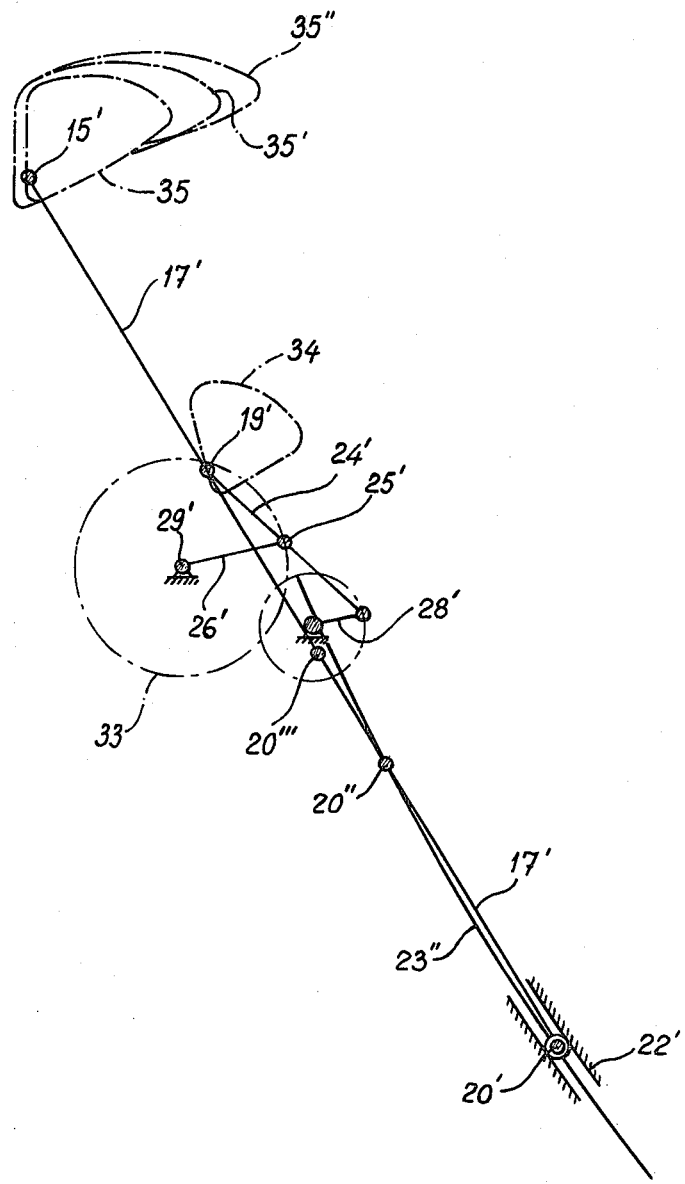
FIG. 5 is a diagrammatic view illustrating the operation of the stop means.

As illustrated in FIG. 1 and 2, the apparatus comprises a first conveyor belt 1 which, at its one end, receives the articles 2 from the conveyor belt 3, which articles are moved forwards in a continuous closed row by conveyor belt 1 (in the direction of the arrow) towards the second conveyor belt 4, consisting of two, spaced apart parallel-extending narrow belts 5. Behind the conveyor belt 4 a drag conveyor 5 is arranged, which is provided with carriers 6, which carriers at the front part of the conveyor belt 4 are moving upwards into the space between the two narrow belts and engaging the articles 2 at their rear sides for conveying them e.g. to a packaging machine. Driving member 7 provides for driving of the drag conveyor 5 and for driving of the conveyor belts 1 and 4 through differential drive 8 and transmission 9 respectively, said transmission being such that the speed of conveyor belt 4 is greater (e.g. twice) than that of conveyor belt 1. At the other end of the belt conveyor 1, a tiltable upper belt 10 prevents the articles 2 from being pushed in a sliding movement along the belt 1 by thrust. When the conveyor belt 1 is long enough so that the thrust can be absorbed without the articles being pushed along the tiltable upper belt 10 can be omitted. Another tiltable upper belt 11 is disposed above the conveyor belt 4. Belt 4 as shown can be replaced by two parallel extending spaced apart side-conveyor belts clamping the articles 2 between them, without the presence of upper belt 11.

In addition, a detecting mechanism 12 is provided which controls the abutting relationship of the arriving articles 2 such that when a space between two articles is detected, the apparatus is stopped. Furthermore, detecting mechanisms 13 and 14 are provided; their operation will be discussed later on.

At the transition point between conveyor belt 1 and conveyor belt 4 a stop mechanism is provided, which is illustrated more in detail in FIGS. 3 and 4.

The stop mechanism comprises a stop means 15 secured on a shaft 16 which is rotatably journaled in an arm 17, said stop means 15 being urged downwardly by spring 18. Arm 17 is pivotably connected to rod 19, while arm 17 is permitted to pivot about the central axis of rod 21 and to slide together with said rod along a slot in guide means 23; the end portion 20 of rod 21 is accomodated in a slot 22 provided in arm 17, so that the position of rod 21 and its end portion 20 can be altered with respect to arm 17. The other end portion of rod 19 is secured to a link means 24, said link means at reference numeral 25 being pivotably connected to a rocker element 26 and by means of rod 27 being connected to a crank means 28. The rocker element 26 is mounted for an up and down rocking motion on shaft 29 mounted in a fixed position. Through change wheel 30 and intermediate wheel 31 the crank means 28 is driven by the wheel 32 coupled to driving means 7.

The operation of the stop mechanism will now be elucidated with reference to the diagrammatic representation (FIG. 5), in which those parts corresponding with the parts of the stop mechanism illustrated in FIG. 4 are indicated by the same reference numeral, but in FIG. 5 they are marked with an accent.

During the rotating movement of the crank means 28' the link means 24' is carried with it, however, the connection point 25' must remain on the circle 33, since the connection point 25' forms the connection between link means 24' and rocker element 26', which rocker element is mounted for a pivotal movement about the fixed shaft 29'. Shaft 19' connecting arm 17' with link means 24' will, thus describe the path 34 which is shown in FIG. 5. Consequently, stop means 15' will describe path 35, while the arm 17' will perform a pivotal movement about point 20'.

As stated before, point 20' may be displaced along arm 17', so that point 20' can be shifted from the one extreme position (illustrated in FIG. 5) to the other extreme position 20'''. In position 20''' the stop means 15' describes path 35'' and in the shown intermediate position 20'' said stop means describes path 35'. Path 35, 35' and 35'' clearly indicate that the possibility of adjustment of point 20 is used for handling articles which vary in length in the apparatus.

The purpose of said adjustability is shown once more in FIG. 6 wherein in consectutive steps shown on top of each other the paths 35, 35' and 35'', as well as the position of stop means 15 with respect to articles 3, 3' and 3'' which vary in size are indicated. It is apparent from this Figure, that stop means 15 moves along in the direction of movement in front of the adjacent article, then moves upwards and returns again to its starting position behind the article which is now carried away faster by conveyor belt 4. When an article is advanced too far, e.g. because of eccessive thrust, the stop means will strike the front of the article and, thus, correct the entire stream of articles arriving on conveyor belt 1.

In operating the apparatus, the stop means 15 is in downward position and it will, thus, form a stop for the arriving articles so that the operation of the apparatus can always be started in its correct position so that the first articles are disposed at once in their correct position with respect to the carriers 6 of the drag conveyor 5 and, thus there is not risk that the first articles have to be discharged.

Since the articles, such as chocolate coated biscuits or similar sweets are rarely of exactly the same length, the speed of the conveyor belt 1 must be controled. To this end, at first the speed of the conveyor belt 1 is set slightly higher than is theoretically required speed, e.g. 1% higher. After a given time the conveyor belt 1 is set at a lower speed during a certain time period; the time can be set e.g. by means of a time relay.

The detecting means 13 compares the arrival of each article with the position of an indicator 36 being coupled to the change wheel 30 (FIG. 4) and making one revolution per article. When the signal of the detecting means 14 which is facing the indicator 36 arrives simultaneously with or slightly later than the signal from detecting means 13, this means that the relevant article has arrived a bit too early; the speed of the conveyor belt 1 is then set at a lower value for a short period of time.

I claim:

1. Apparatus for positioning articles between the carriers of a drag conveyor, said articles being fed in a continuous closed row, comprising a first conveyor belt or conveyor-belt system, capable of receiving the articles at one end and a second conveyor belt or conveyor-belt system disposed in line with the first conveyor belt, said second belt being arranged to move at a speed which is greater than the speed of the first conveyor belt and to transfer the articles to the drag conveyor, characterized in that at the transition point between the first conveyor belt and the second conveyor belt a stop means is provided, said stop means being provided on an arm, said arm being mounted for a pivotal movement about a pivot point and a sliding movement along said point, said arm being connected to a crank means through a link means, said link means at one end being pivotably connected to the arm and at its other end being connected to said crank means and intermediate said ends being pivotably connected to a rocker element mounted for a pivotal movement about a fixed point, the movement of said stop means being synchronized with respect to the movement of the drag conveyor, said stop means being movable in a endless path, said path comprising a first portion extending essentially parallel to the first conveyor belt in the direction of travel, a second portion directed backwards and away from the conveyor belt and a third portion directed again towards the conveyor belt, such that during operation, in the first path portion the stop means moves along with and at a distance in front of an article which is advanced by said first conveyor belt, then in the second path portion said stop means moves away from said article and past said article to the rear and subsequently, in the third path portion, said stop means returns to its starting point behind the article then being moved along faster by the second conveyor belt and in front of the next article still lying on the first conveyor belt.

2. Apparatus according to claim 1, characterized in that the pivot point of the arm is adjustable.

3. Apparatus according to claim 2 or 1 inclusive, characterized in that a detecting means for scanning an arriving article is disposed at the second conveyor belt and an indicator is present, the rotating movement of which is synchronized with respect to the movement of the drag conveyor while a second detecting mechanism is provided in the proximity of said indicator, and means are present for comparing the signals from the detecting mechanisms and for giving a signal for changing the speed of the first conveyor belt.

* * * * *